P. K. DEDERICK.

Hay and Cotton Press.

No. 8,130. Reissued March 19, 1878.

Witnesses,
Franck L. Durand
W. C. Jordinton

Inventor,
Peter K. Dederick
By Hill & Ellsworth
His Attys.

THE NORRIS PETERS CO., PHOTO-LITHO., WASHINGTON, D. C.

UNITED STATES PATENT OFFICE.

PETER K. DEDERICK, OF ALBANY, NEW YORK.

IMPROVEMENT IN HAY AND COTTON PRESSES.

Specification forming part of Letters Patent No. 132,566, dated October 29, 1872; Reissue No. 7,981, (Division A,) dated December 11, 1877; Reissue No. 8,130, dated March 19, 1878; application filed February 26, 1878.

*To all whom it may concern:*

Be it known that I, PETER K. DEDERICK, of Albany, in the county of Albany and State of New York, have invented certain new and useful Improvements in Baling-Presses, of which the following is a specification:

My improvements consist in the form and construction of the machine as per specification following, and in the novel manner of forming, dividing, and discharging the bales.

Figure 1:
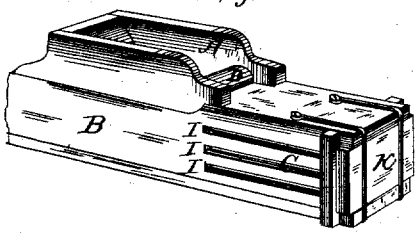
Figure 2:
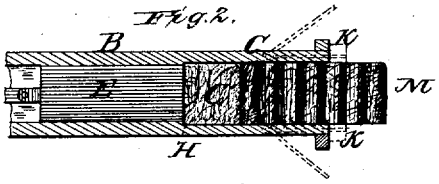

Figure 1 is a perspective view of the machine. Fig. 2 is a top view, showing my improvements and their connection, and the manner of pressing and discharging the bale; and Fig. 3 illustrates the yielding traverser.

In the figures, A is the hopper and feed-orifice for receiving the loose material, and is constructed with an adjustable bottom. B is the press-box, into which the loose hay is received and pressed. C is the bale-chamber, into which the hay is deposited after pressing. The press-box and bale-chamber occupy a procumbent, lying down, or prostrate position. D is a roller, to assist in guiding the hay into the press-box. E is the traverser, which is so constructed and combined as to close the feed-orifice and form an adjustable bottom to the hopper during the pressing operation. The power may be applied to the traverser in a variety of ways.

The press-box B, Fig. 2, is a little smaller than the bale-chamber C, so as to form a shoulder at H, to prevent the pressed material from expanding or following the traverser back.

Figure 3:
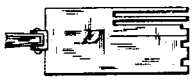

I construct the traverser with contracting or yielding front, as shown in Fig. 3, so as to wedge together when the hay overlaps it, thus preventing its binding. It resumes its dimensions again by its own flexibility, as shown; or springs or rubber may be substituted, as what is required is simply a yielding side or corner to the traverser on the side of the feed-orifice.

The bale, when formed in the bale-chamber C, is tied or bound, through the slots I I I, in the box, as shown in Fig. 1, and is removed or forced out of the end of the press at K by the pressure exerted by the traverser against the fresh material in building up the next bale, as shown, C′ being the forming bale and M the finished bale, the bands used in binding the bale forming the division or separation. By this method the finished bale is ejected in proportion as the forming bale is built up, each additional charge of material forming a section, which is forced beyond the stroke of the traverser, and moving the finished bale along in proportion to the size of the section; and the operation is thus continued until the bale is ejected from the press.

The distance between the head of the press and the traverser, when nearest the head, or, in other words, the distance between the retainers that prevent the hay from expanding and the head, may be greater than the transverse and vertical dimensions of the bale-chamber, thus forming the length of the bale toward the traverser or point of filling; and, as the expansion is always in the same direction—toward the traverser or power—it will be proportionately less than it would be if the bale were built up from the sides instead of the ends.

In operation, the hay or material to be pressed is pitched into the hopper A, whence it falls into the press-box B, and is forced into the bale-chamber C through means of the reciprocating traverser E. Meantime the hopper A is again filled, the traverser or an equivalent slide attached, closing the feed-orifice and forming the hopper-bottom, is removed by the power, and the loose hay falls from the hopper into the press-box, and is also forced into the bale-chamber. This is continued until the bale-chamber is pressed full, when the bale may be tied off and the end door opened. This bale, however, will be rough, in consequence of having nothing compact to commence the bale against.

The operation now changes, and the pressing, instead of being performed in the bale-chamber C, is completed, or nearly so, in the press-box B, the compressed sections being forced into the bale-chamber, and the finished bale ejected as fast as the compressed sections are forced behind it within the chamber, and the compressed sections compacted and as a bale finished against the door, which is closed after the previously-formed bale is ejected, thus building up the bale in pressed sections, piled one against another; and the operation is thus continued, the first bale only being roughly put up.

The subject-matter of the following claims, with the exception of the second and ninth, is substantially shown in my Patent No. 132,639, dated October 29, 1872, and in an application for a reissue of the same, but is not there claimed.

Having thus described my invention, I claim as follows:

1. The press-box and bale-chamber B C, in combination with the receiving-box or hopper A, having an adjustable bottom, substantially for the purpose set forth.

2. The combination of the roller D with the press-box B and traverser E, for the purpose set forth.

3. The slots I, in combination with the bale-chamber C, provided with shoulders, substantially for the purpose set forth.

4. The above-described method of successively ejecting finished bales from a press by means of additional charges of material forced within the chamber.

5. The procumbent or horizontal press-box and bale-chamber B C, constructed with a feed-orifice at the top, as at A, and provided with horizontal side-tying slots I, substantially for the purpose set forth.

6. A press for baling hay, cotton, and other fibrous material that is bound into bales, so constructed, combined, and operated that the hay is fed in or pressed at one end of the chamber and forced out at the other end by a common traverser and simultaneous operation, as set forth.

7. A press for baling hay, cotton, and other fibrous material that is bound into bales, so constructed, combined, and operated that the finished bale is forced out of one end of the chamber as the loose material is fed in or pressed at the other end by a common traverser and simultaneous operation, as set forth.

8. The traverser E, constructed with a contracting or yielding front, to wedge together when the hay overlaps it, substantially for the purpose set forth.

9. The bands used in binding the bales as a partition or separation between the completed and forming bales, as set forth.

10. The retaining-shoulder H, in combination with the bale-chamber C and traverser E, for the purpose set forth.

11. In a procumbent press, in which the hay and other loose material is pressed in sections into bales, the slots I, in combination with the press-case B C and traverser E, for the purpose set forth.

P. K. DEDERICK.

Witnesses:
WM. BLACKSTOCK,
MELVILLE CHURCH.